United States Patent
Hasegawa

(10) Patent No.: US 7,108,786 B2
(45) Date of Patent: Sep. 19, 2006

(54) FILTRATION APPARATUS

(75) Inventor: Yoshitomo Hasegawa, Yawara-mura (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 10/883,939

(22) Filed: Jul. 2, 2004

(65) Prior Publication Data

US 2005/0035043 A1 Feb. 17, 2005

(30) Foreign Application Priority Data

Aug. 12, 2003 (JP) ............................. 2003-207282

(51) Int. Cl.
*B01D 35/14* (2006.01)
*B01D 35/30* (2006.01)
*B01D 35/34* (2006.01)

(52) U.S. Cl. ..................... 210/232; 210/238; 210/452; 220/832

(58) Field of Classification Search ............... 210/232, 210/238, 452; 220/832
See application file for complete search history.

(56) References Cited

U.S. PATENT DOCUMENTS

| | | | | |
|---|---|---|---|---|
| 1,726,758 A | * | 9/1929 | Olson | ........................ 210/232 |
| 3,640,392 A | * | 2/1972 | Smith et al. | ................. 210/232 |
| 4,419,234 A | * | 12/1983 | Miller et al. | ................. 210/232 |
| 4,867,302 A | * | 9/1989 | Takahashi | .................... 206/755 |
| 5,246,581 A | * | 9/1993 | Goldman | ..................... 210/452 |
| 5,893,969 A | * | 4/1999 | Goldman | ...................... 210/95 |

FOREIGN PATENT DOCUMENTS

| | | | |
|---|---|---|---|
| JP | 06-327914 | * | 11/1994 |
| JP | 3082767 | | 10/2001 |

\* cited by examiner

Primary Examiner—Thomas M. Lithgow
(74) Attorney, Agent, or Firm—Baker Botts L.L.P.

(57) ABSTRACT

A filtration apparatus having a cover pivotably installed through a hinge mechanism has a casing bracket secured to a casing flange and a cover bracket secured to the cover. A pin is inserted through insertion holes in side walls of the casing bracket and through insertion holes in side walls of the cover bracket. The filtration apparatus is provided with a stopper mechanism for maintaining the cover in a full-open position when it is fully opened, and also provided with a stopper-releasing mechanism for canceling the stopper function.

4 Claims, 3 Drawing Sheets

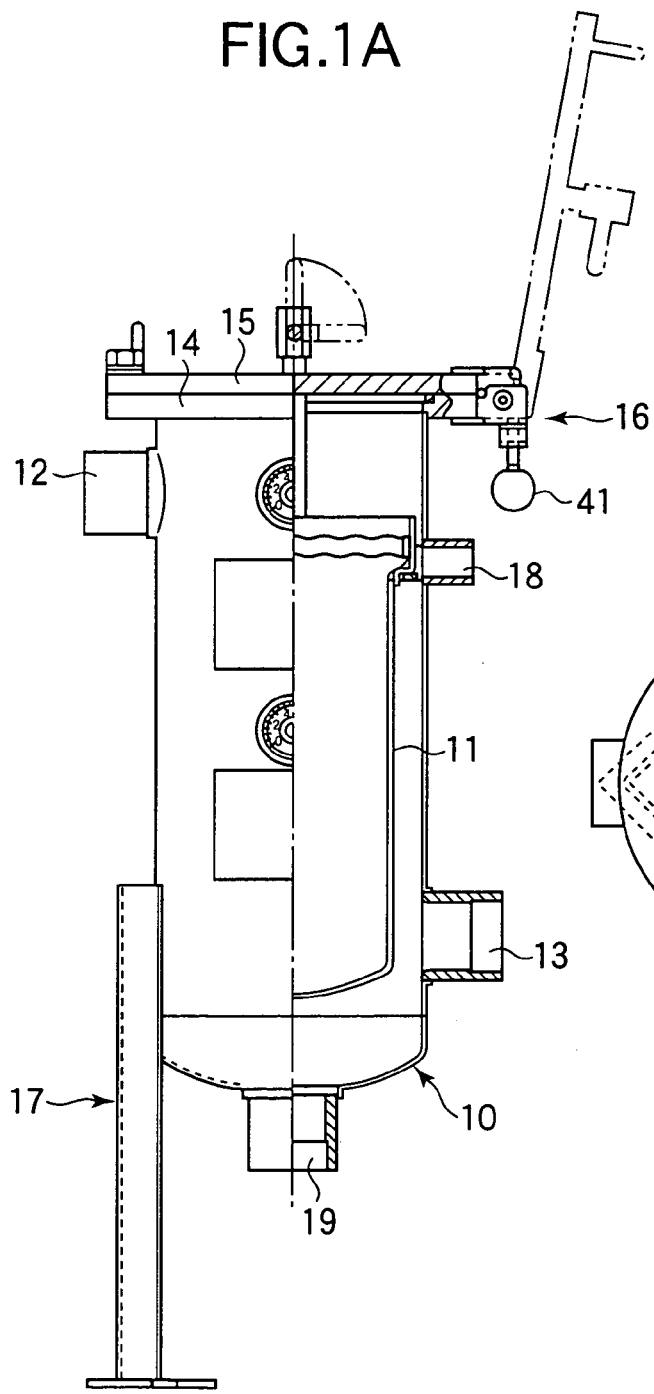
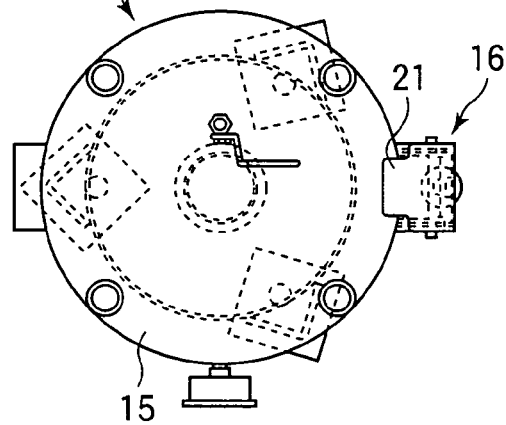

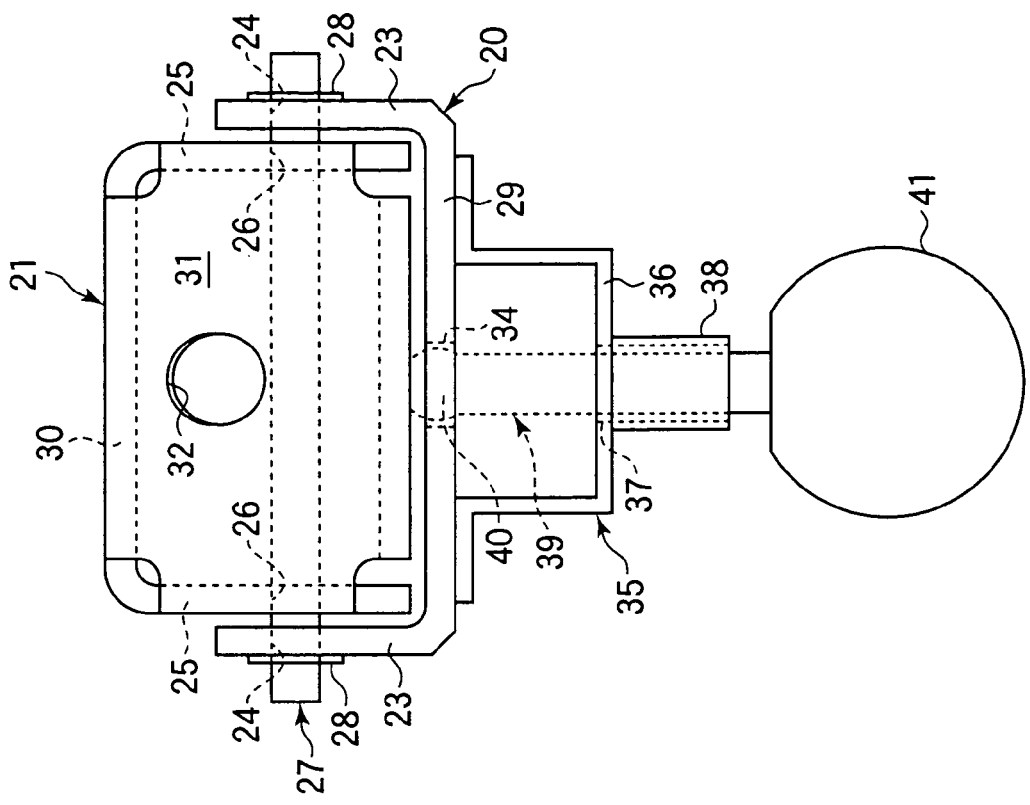
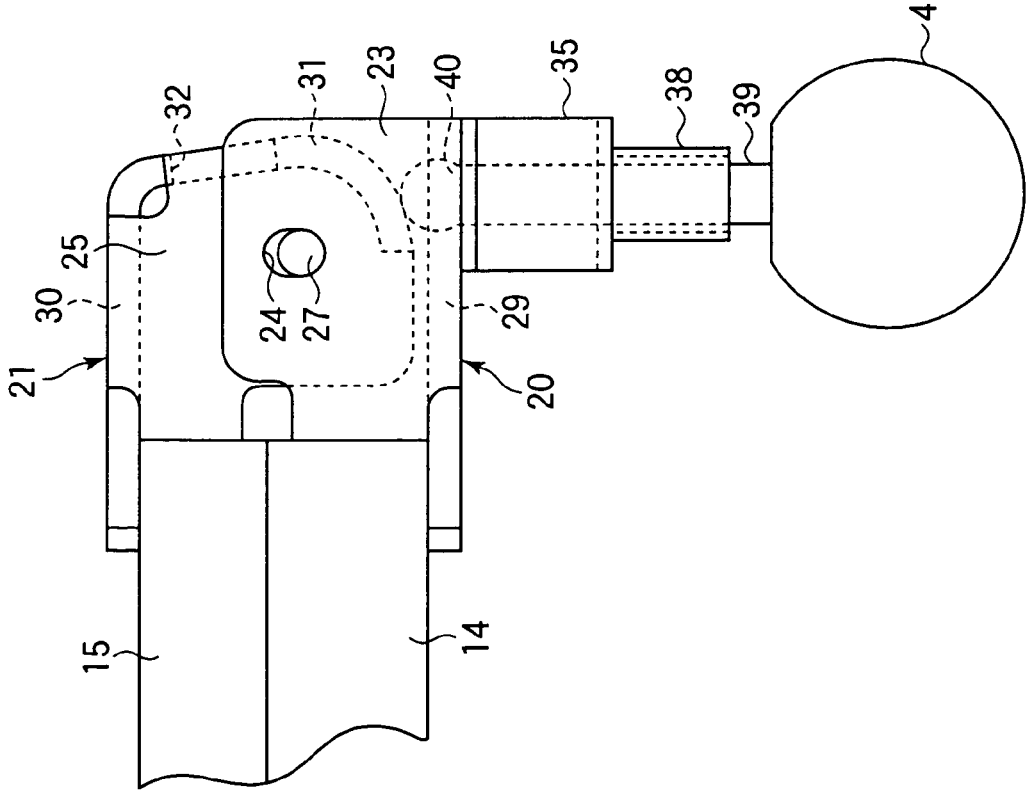

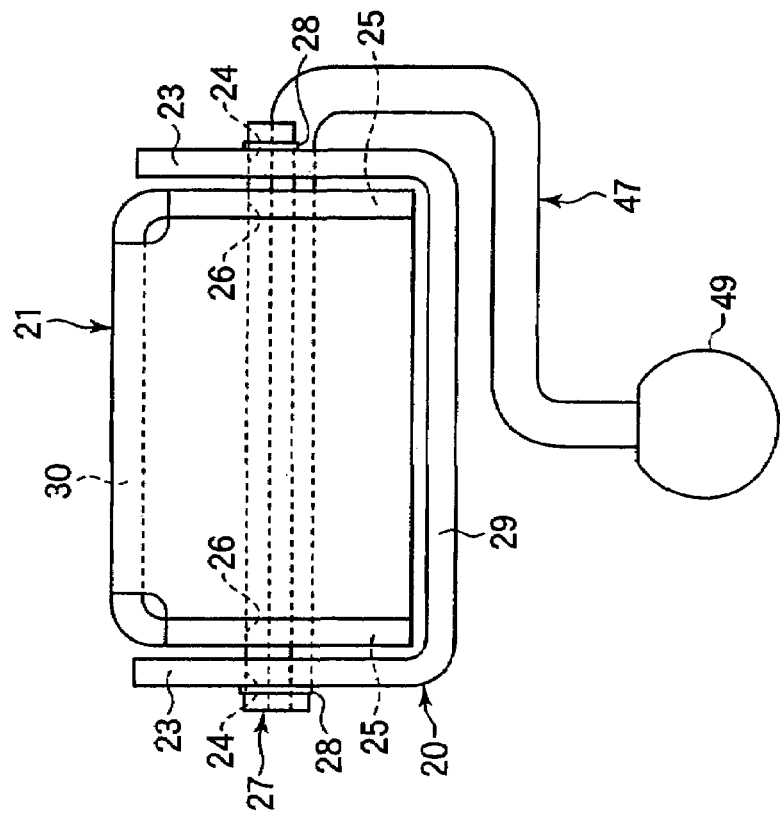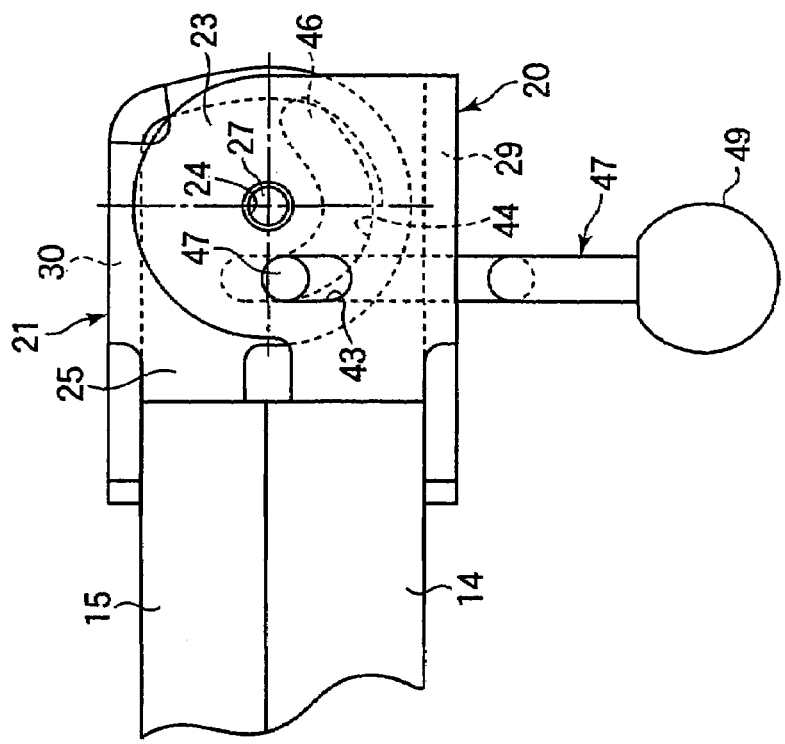

FILTRATION APPARATUS

BACKGROUND OF THE INVENTION

1. Field of the Invention

The present invention relates to a liquid filtration apparatus installed, for example, in an automotive parts cleaning line.

2. Description of the Related Art

There has heretofore been known a filtration apparatus having a filter element installed in a casing. A liquid inlet is formed in an upper portion of the casing so as to communicate with the inside of the filter element. A liquid outlet is formed in a lower portion of the casing so as to communicate with the outside of the filter element in the casing. An annular casing flange is secured to the upper end of the casing. A cover for closing an open end of the casing flange is pivotably installed through a hinge mechanism. Japanese Utility Model Registration No. 3,082,767 discloses a filtration apparatus having a cover pivotably installed through a hinge mechanism, although this filtration apparatus is slightly different in type from the above-described known filtration apparatus.

The conventional filtration apparatus suffers, however, from the problem that when the cover is in a full-open position (i.e. when it is opened through about 100 degrees and suspended in this position), the cover may be undesirably closed by an external force applied thereto. Therefore, there is a danger of the operator's fingers being caught between the cover and the flange when the cover is closed accidentally. Accordingly, the operator cannot perform a desired operation without anxiety.

SUMMARY OF THE INVENTION

An object of the present invention is to provide a filtration apparatus having a cover pivotably installed through a hinge mechanism, which is provided with a stopper mechanism for maintaining the cover in a full-open position when it is fully opened, and also provided with a stopper-releasing mechanism for canceling the stopper function.

To attain the above-described object, the present invention is applied to a filtration apparatus including a casing and a filter element installed in the casing. A liquid inlet is formed in an upper portion of the casing so as to communicate with the inside of the filter element. A liquid outlet is formed in a lower portion of the casing so as to communicate with the outside of the filter element in the casing. An annular casing flange is secured to the upper end of the casing. A cover for closing an open end of the casing flange is pivotably installed through a hinge mechanism.

According to a first arrangement of the present invention, a casing bracket is secured to the casing flange, and a cover bracket is secured to the cover. A pin is inserted through insertion holes in side walls of the casing bracket and through insertion holes in side walls of the cover bracket. The filtration apparatus is provided with a stopper mechanism for maintaining the cover in a full-open position when it is fully opened, and also provided with a stopper-releasing mechanism for canceling the stopper function.

According to a second arrangement of the present invention, the filtration apparatus according to the first arrangement is arranged as follows. The casing bracket has a bottom wall and a pair of mutually opposing side walls. The bottom wall has a bottom wall through-hole. The cover bracket has a top wall, a curved abutting wall and a pair of mutually opposing side walls. The abutting wall has an engagement hole. A retaining member is secured to the bottom wall of the casing bracket. The retaining member has a retaining wall through-hole formed in a retaining wall constituting the bottom of the retaining member. A stopper member is inserted through the bottom wall through-hole and the retaining wall through-hole. The stopper member has an engagement projection formed at the upper end thereof. A stopper-releasing knob is secured to the lower end of the stopper member. A spring is fitted between the engagement projection and the retaining wall. The engagement projection is pressed against the abutting wall by urging force from the spring. When the cover is fully opened, the engagement projection is engaged in the engagement hole.

According to a third arrangement of the present invention, the filtration apparatus according to the first arrangement is arranged as follows. The casing bracket has a bottom wall and a pair of mutually opposing side walls. The side walls have vertically elongated engagement holes, respectively. The cover bracket has a top wall and a pair of mutually opposing side walls. The side walls of the cover bracket have curved engagement slots, respectively. A straight insert portion of a stopper rod is inserted through the vertically elongated engagement holes and the curved engagement slots. A joint portion of the stopper rod extends directly below the bottom wall of the casing bracket. A stopper-releasing knob is connected to the distal end of the joint portion of the stopper rod.

In the filtration apparatus according to the present invention, a casing bracket is secured to the casing flange, and a cover bracket is secured to the cover. A pin is inserted through insertion holes in side walls of the casing bracket and through insertion holes in side walls of the cover bracket. The filtration apparatus is provided with a stopper mechanism for maintaining the cover in a full-open position when it is fully opened, and also provided with a stopper-releasing mechanism for canceling the stopper function. Accordingly, the cover when fully opened can be maintained in the full-open position by the stopper mechanism, and the stopper function can be canceled by the stopper-releasing mechanism.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1A is a front view of a first embodiment of the filtration apparatus according to the present invention.

FIG. 1B is a top plan view of FIG. 1A.

FIG. 2A is a fragmentary enlarged view showing a hinge mechanism in FIG. 1A.

FIG. 2B is a side view of FIG. 2A.

FIG. 3A is an enlarged front view showing an essential part of a second embodiment of the filtration apparatus according to the present invention.

FIG. 3B is a side view of FIG. 3A.

DESCRIPTION OF THE PREFERRED EMBODIMENTS

FIGS. 1A, 1B, 2A and 2B show a first embodiment of the filtration apparatus according to the present invention. As shown in FIGS. 1A and 1B, a casing 10 has a filter element 11 installed therein. A liquid inlet 12 is formed in an upper portion of the casing 10 so as to communicate with the inside of the filter element 11. A liquid outlet 13 is formed in a lower portion of the casing 10 so as to communicate with the outside of the filter element 11 in the casing 10. An annular casing flange 14 is secured to the upper end of the casing 10. A cover 15 for closing the opening of the casing flange 14 is pivotably installed through a hinge mechanism 16. The casing 10 is supported by a support 17. A drain 18 is formed on a side wall of the casing 10. A drainage port 19 is formed at the lower end of the casing 10.

As shown in FIGS. 1A, 1B, 2A and 2B, a casing bracket 20 is secured to the casing flange 14, and a cover bracket 21 is secured to the cover 15. The casing bracket 20 has a bottom wall 29 and a pair of mutually opposing side walls 23. The cover bracket 21 has a top wall 30, a curved abutting wall 31, and a pair of mutually opposing side walls 25. In FIGS. 2A and 2B, which show a state where the cover 15 is closed, the abutting wall 31 of the cover bracket 21 extends downward from the right end of the top wall 30 and curves leftward at a lower end portion thereof. The abutting wall 31 has an engagement hole 32 in an approximately vertical wall portion thereof, which extends downward from the top wall 30. The spacing between the side walls 23 of the casing bracket 20 is wider than the spacing between the side walls 25 of the cover bracket 21. The side walls 25 of the cover bracket 21 are positioned inside the side walls 23 of the casing bracket 20. It should be noted that the casing bracket 20 and the cover bracket 21 can be formed by bending metal plates.

Insertion holes 24 are formed in the side walls 23 of the casing bracket 20 at approximately central positions of upwardly projecting portions thereof. Insertion holes 26 are formed in the side walls 25 of the cover bracket 21 at approximately central positions of downwardly projecting portions thereof. A pin 27 is inserted through the insertion holes 24 in the side walls 23 of the casing bracket 20 and through the insertion holes 26 in the side walls 25 of the cover bracket 21. Bush nuts 28 are secured to both ends of the pin 27 to prevent the pin 27 from coming off. Thus, the hinge mechanism 16 is constructed. As shown clearly in FIG. 2B, a retaining member 35 is secured at both flange portions thereof to the lower side of the bottom wall 29 of the casing bracket 20. Spacing walls extend downward from the inner ends of the flange portions of the retaining member 35. The lower ends of the spacing walls are connected by a horizontal retaining wall 36 (constituting the bottom of the retaining member 35). The bottom wall 29 of the casing bracket 20 is formed with a bottom wall through-hole 34. The retaining wall 36 is formed with a retaining wall through-hole 37. The bottom wall through-hole 34 and the retaining wall through-hole 37 are positioned on the same axis. A guide cylinder 38 is secured to the lower side of the retaining wall 36 around the opening of the retaining wall through-hole 37. The retaining wall through-hole 37 and the bore of the guide cylinder 38 have the same diameter and are in coaxial alignment with each other.

A stopper member 39 is inserted through the bottom wall through-hole 34, the retaining wall through-hole 37 and the bore of the guide cylinder 38. An engagement projection 40 is formed at the upper end of the stopper member 39. A stopper-releasing knob 41 is secured to the lower end of the stopper member 39. A spring (not shown) is fitted between the lower side of the engagement projection 40 and the upper side of the retaining wall 36. Thus, the engagement projection 40 is pressed toward the surface of the abutting wall 31 by urging force from the spring. In the position where the cover 15 is fully closed, as shown in FIGS. 2A and 2B, the engagement projection 40 abuts on the surface of the abutting wall 31. If the cover 15 is pivoted through about 100 degrees to a full-open position, the engagement hole 32 of the abutting wall 31 moves to a position opposite the engagement projection 40. Thereupon, the engagement projection 40 is moved upward to fit into the engagement hole 32 by the urging force of the spring. Thus, the engagement projection 40 and the engagement hole 32 engage with each other. It should be noted that the insertion holes 24 and 26 are slightly elongated in the vertical direction. Therefore, there is a gap between the pin 27 and the insertion holes 24 and 26. The gap allows the position of the engagement hole 32 to be finely adjusted and hence enables the engagement projection 40 to fit into the engagement hole 32 easily.

The engagement between the engagement projection 40 and the engagement hole 32 allows the cover 15 to be maintained in the full-open position. The cover 15 cannot be closed even if an external force acts thereon. The operator can continue maintenance or other operation safely without the fear of being involved in an accident that might otherwise be caused by movement of the cover 15 to the closed position. When the cover 15 is to be closed upon completion of the operation, the operator moves the stopper-releasing knob 41 downward against the urging force of the spring to pull the engagement projection 40 of the stopper member 39 out of the engagement hole 32 of the abutting wall 31, thereby canceling the engagement between the engagement projection 40 and the engagement hole 32. When the engagement projection 40 and the engagement hole 32 are disengaged from each other, the cover 15 can be moved to the full-closed position.

FIGS. 3A and 3B show a second embodiment of the filtration apparatus according to the present invention. In the following description made in connection with FIGS. 3A and 3B, the same members as those in FIGS. 1A, 1B, 2A and 2B are denoted by the same reference numerals as in FIGS. 1A, 1B, 2A and 2B. A casing bracket 20 is secured to a casing flange 14, and a cover bracket 21 is secured to a cover 15. The casing bracket 20 has a bottom wall 29 and a pair of mutually opposing side walls 23. The cover bracket 21 has a top wall 30 and a pair of mutually opposing side walls 25. The spacing between the side walls 23 of the casing bracket 20 is wider than the spacing between the side walls 25 of the cover bracket 21, and the side walls 25 of the cover bracket 21 are positioned inside the side walls 23 of the casing bracket 20, in the same way as in the first embodiment. In FIG. 3A, one side wall 23 of the casing bracket 20 is shown by the solid lines (i.e. the top of the side wall 23 is shown by the solid-line circular arc), and one side wall 25 of the cover bracket 21 is shown beyond the side wall 23 of the casing bracket 20, partly by a dotted-line circular arc. A pin 27 is inserted through insertion holes 24 in the side walls 23 of the casing bracket 20 and through insertion holes 26 in the side walls 25 of the cover bracket 21. Bush nuts 28 are secured to both ends of the pin 27 to prevent the pin 27 from coming off. Thus, a hinge mechanism 16 is constructed.

The side walls 23 of the casing bracket 20 are formed with vertically elongated engagement holes 43 extending through the respective side walls 23. The side walls 25 of the cover bracket 21 are formed with curved engagement slots 44 extending through the respective side walls 25. In the front view of FIG. 3A, the greater part of the curved engagement slot 44 is a circular arc-shaped portion with a predetermined width. The right end portion of the curved engagement slot 44 is curved radially outward relative to the circular arc-shaped portion to form a stopper portion 46. A straight insert portion of a stopper rod 47 is inserted through the vertically elongated engagement holes 43 and the curved engagement slots 44. As shown in FIG. 3B, the stopper rod 47 is straight at its straight insert portion extending between the left and right vertically elongated engagement holes 43. However, the joint portion of the stopper rod 47 (i.e. the portion other than the straight insert portion) extends directly downward from a part of the straight insert portion that extends slightly rightward from the right vertically elongated engagement hole 43. The joint portion further extends leftward and then extends directly downward from a position directly below the lateral center of the casing bracket 20. A stopper-releasing knob 49 is secured to the lower end of the stopper rod 47 (i.e. the distal end of the joint portion).

When the cover 15 is in a full-closed position, as shown in FIGS. 3A and 3B, the stopper rod 47 is located at the upper end position in each vertically elongated engagement hole 43 and at the left end position (initial position) in each curved engagement slot 44. When the operator begins to open the cover 15 by pivoting it, the stopper rod 47 engages the curved engagement slot 44 at a position rightward of the initial position. When the cover 15 is pivoted through about 100 degrees to a full-open position, the stopper rod 47 engages the stopper portion 46 at the right end of the curved engagement slot 44. At this time, the stopper rod 47 is located at the lower end position in the vertically elongated engagement hole 43. When the stopper rod 47 is in engagement with the stopper portion 46, the cover 15 is maintained in the full-open position and cannot be closed even if an external force acts on the cover 15. The reason for this is as follows. Because the stopper portion 46 of each curved engagement slot 44 is radially outward of the circular arc-shaped portion, even if an external force acts on the cover 15 so as to close it, the stopper rod 47 is prevented from entering the circular arc-shaped portion by the wall surface of the stopper portion 46. Accordingly, the cover 15 is maintained in the full-open position. Therefore, the operator can continue maintenance or other operation safely without the fear of being involved in an accident that might otherwise be caused by movement of the cover 15 to the closed position.

When the cover 15 is to be closed upon completion of the operation, the operator moves the stopper-releasing knob 49 upward against the frictional resistance between the stopper rod 47 and the stopper portion 46, causing the stopper rod 47 to move into the circular arc-shaped portion of the curved engagement slot 44. When the stopper rod 47 has moved into the circular arc-shaped portion of the curved engagement slot 44, the engagement between the stopper rod 47 and the stopper portion 46 is canceled. When the stopper rod 47 and the stopper portion 46 are disengaged from each other, the cover 15 can be moved to the full-closed position.

It should be noted that the present invention is not necessarily limited to the foregoing embodiments but can be modified in a variety of ways without departing from the gist of the present invention.

What is claimed is:

1. In a filtration apparatus comprising:
a casing;
a filter element installed in the casing;
a liquid inlet formed in an upper portion of the casing so as to communicate with an inside of the filter element;
a liquid outlet formed in a lower portion of the casing so as to communicate with an outside of the filter element in the casing;
an annular casing flange secured to an upper end of the casing; and
a cover for closing an open end of the casing flange, the cover being pivotably installed through a hinge mechanism;
the improvement which comprises:
a casing bracket secured to said casing flange;
a cover bracket secured to said cover;
a pin inserted through insertion holes in side walls of said casing bracket and through insertion holes in side walls of said cover bracket;
a stopper mechanism for maintaining said cover in a full-open position when said cover is fully opened; and
a stopper-releasing mechanism for canceling the stopper function;
wherein said casing bracket has a bottom wall and a pair of mutually opposing side walls, said bottom wall having a bottom wall through-hole, and
said cover bracket has a top wall, a curved abutting wall and a pair of mutually opposing side walls, said abutting wall having an engagement hole,
said filtration apparatus further comprising:
a retaining member secured to the bottom wall of said casing bracket, said retaining member having a retaining wall through-hole formed in a retaining wall constituting a bottom of said retaining member;
a stopper member inserted through said bottom wall through-hole and said retaining wall through-hole, said stopper member having an engagement projection formed at an upper end thereof;
a stopper-releasing knob secured to a lower end of said stopper member; and
a spring fitted between said engagement projection and said retaining wall, so that said engagement projection is pressed against said abutting wall by urging force from said spring, and when said cover is fully opened, said engagement projection is engaged in said engagement hole.

2. In a filtration apparatus comprising:
a casing;
a filter element installed in the casing;
a liquid inlet formed in an upper portion of the casing so as to communicate with an inside of the filter element;
a liquid outlet formed in a lower portion of the casing so as to communicate with an outside of the filter element in the casing;
an annular casing flange secured to an upper end of the casing; and
a cover for closing an open end of the casing flange, the cover being pivotably installed through a hinge mechanism;
the improvement which comprises:
a casing bracket secured to said casing flange;
a cover bracket secured to said cover;
a pin inserted through insertion holes in side walls of said casing bracket and through insertion holes in side walls of said cover bracket;
a stopper mechanism for maintaining said cover in a full-open position when said cover is fully opened; and
a stopper-releasing mechanism for canceling the stopper function;
wherein said casing bracket has a bottom wall and a pair of mutually opposing side walls, said side walls having vertically elongated engagement holes, respectively, and said cover bracket has a top wall and a pair of mutually opposing side walls, said side walls having curved engagement slots, respectively, said filtration apparatus further comprising:

a stopper rod having a straight insert portion inserted through said vertically elongated engagement holes and said curved engagement slots, said stopper rod having a joint portion extending directly below the bottom wall of said casing bracket; and a stopper-releasing knob connected to a distal end of the joint portion of said stopper rod.

3. In a filtration apparatus comprising:

a casing;

a filter element installed in the casing;

a liquid inlet formed in an upper portion of the casing so as to communicate with an inside of the filter element;

a liquid outlet formed in a lower portion of the casing so as to communicate with an outside of the filter element in the casing;

an annular casing flange secured to an upper end of the casing; and a cover for closing an open end of the casing flange, the cover being pivotably installed through a hinge mechanism;

the improvement which comprises:

a casing bracket secured to said casing flange;

a cover bracket secured to said cover;

a pin inserted through insertion holes in side walls of said casing bracket and through insertion holes in side walls of said cover bracket;

wherein said casing bracket has a bottom wall, said bottom wall having a bottom wall through-hole, and wherein said cover bracket has a curved abutting wall, said abutting wall having an engagement hole, further comprising:

a stopper member having an engagement projection formed at an upper end thereof;

a stopper-releasing knob secured to a lower end of said stopper member;

and when said cover is fully opened, said engagement projection is engaged in said engagement hole through said bottom wall through-hole.

4. A filtration apparatus according to claim 3 further comprising:

a retaining member secured to the bottom wall of said casing bracket, said retaining member having a retaining wall through-hole formed in a retaining wall constituting a bottom of said retaining member;

said stopper member inserted through said bottom wall through-hole and said retaining wall through-hole; and a spring fitted between said engagement projection and said retaining wall so that said engagement projection is pressed against said abutting wall by urging force from said spring.

* * * * *